(12) United States Patent
Yokomizo

(10) Patent No.: US 10,452,329 B2
(45) Date of Patent: Oct. 22, 2019

(54) INFORMATION PROCESSING APPARATUS THAT CONTROLS DISPLAY OF AN ERASURE MODE SETTING SCREEN BASED ON A TYPE OF STORAGE DEVICE IN THE APPARATUS, AND METHOD OF CONTROLLING THE SAME

(71) Applicant: CANON KABUSHIKI KAISHA, Tokyo (JP)

(72) Inventor: So Yokomizo, Kashiwa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/684,190

(22) Filed: Aug. 23, 2017

(65) Prior Publication Data

US 2018/0074766 A1 Mar. 15, 2018

(30) Foreign Application Priority Data

Sep. 9, 2016 (JP) .................................. 2016-177141

(51) Int. Cl.
*G06F 3/06* (2006.01)
*G06F 3/12* (2006.01)

(52) U.S. Cl.
CPC .......... *G06F 3/1274* (2013.01); *G06F 3/0605* (2013.01); *G06F 3/0608* (2013.01); *G06F 3/0652* (2013.01); *G06F 3/0673* (2013.01); *G06F 3/0679* (2013.01); *G06F 3/1205* (2013.01); *G06F 3/1285* (2013.01)

(58) Field of Classification Search
CPC .... G06F 3/1274; G06F 3/0652; G06F 3/1205; G06F 3/1285; G06F 3/0608; G06F 3/0673
See application file for complete search history.

(56) References Cited

U.S. PATENT DOCUMENTS

| 8,990,588 B2* | 3/2015 | Shimmitsu .............. G06F 3/061 380/239 |
| 2002/0181134 A1 | 12/2002 | Bunker et al. |
| 2004/0268073 A1 | 12/2004 | Morisawa |

(Continued)

FOREIGN PATENT DOCUMENTS

| EP | 1357468 A2 | 10/2003 |
| JP | 2015-219602 A | 12/2015 |

OTHER PUBLICATIONS

European Search Report issued in corresponding European Application No. 17184410.3 dated Jan. 5, 2018.

(Continued)

*Primary Examiner* — Kent Yip
(74) *Attorney, Agent, or Firm* — Venable LLP

(57) ABSTRACT

A CPU of an information processing apparatus (MFP) obtains device information of a secondary storage device installed in the MFP and discriminates, based on the obtained device information, whether the secondary storage device is of a type that supports an erasure command (TRIM command) that provides notification of information indicating data to be erased from the storage device. The CPU controls display of a setting screen for erasure modes by controlling, in accordance with the discrimination result, whether to display erasure modes for executing erasure processing based on an erasure command in a selectable manner.

47 Claims, 10 Drawing Sheets

(56) References Cited

U.S. PATENT DOCUMENTS

| | | | |
|---|---|---|---|
| 2006/0139680 A1* | 6/2006 | Okamoto | H04N 1/32486 358/1.14 |
| 2011/0238901 A1 | 9/2011 | Koga et al. | |
| 2012/0084489 A1* | 4/2012 | Gorobets | G06F 12/0246 711/103 |
| 2015/0277466 A1 | 10/2015 | Yokomizo | |
| 2015/0331790 A1 | 11/2015 | Kishi et al. | |

OTHER PUBLICATIONS

European Search Report issued in corresponding European Application No. 17184410.3 dated Apr. 30, 2019.

* cited by examiner

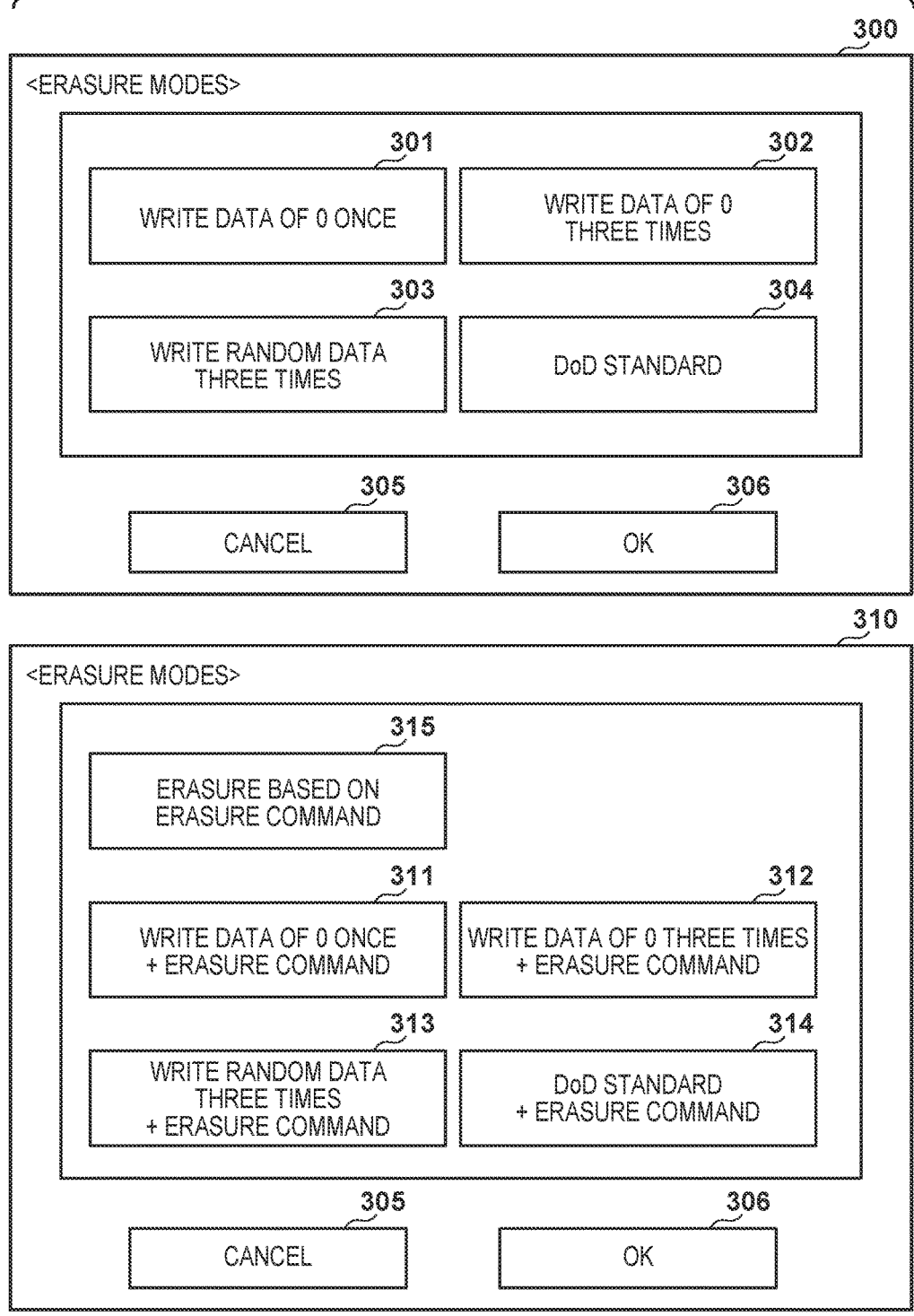

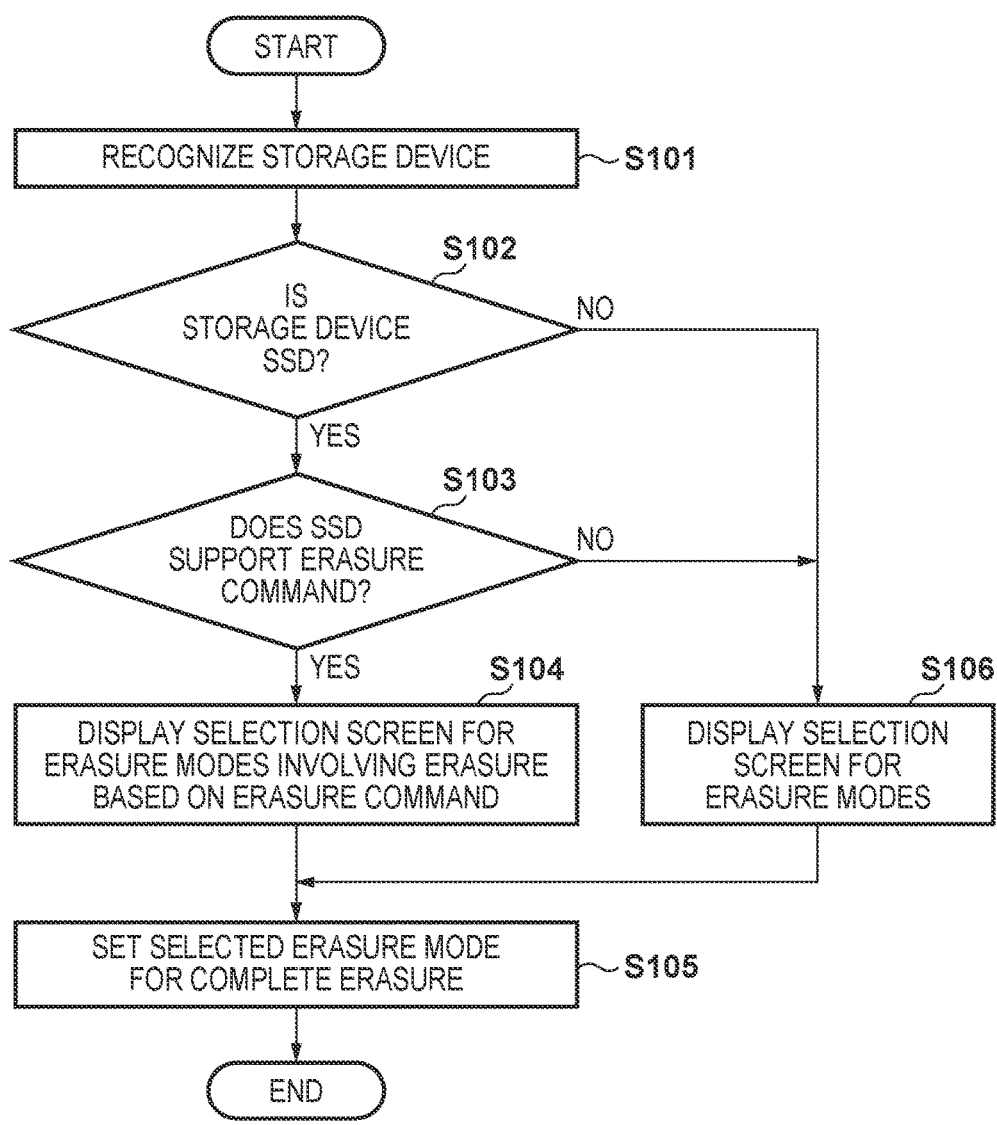

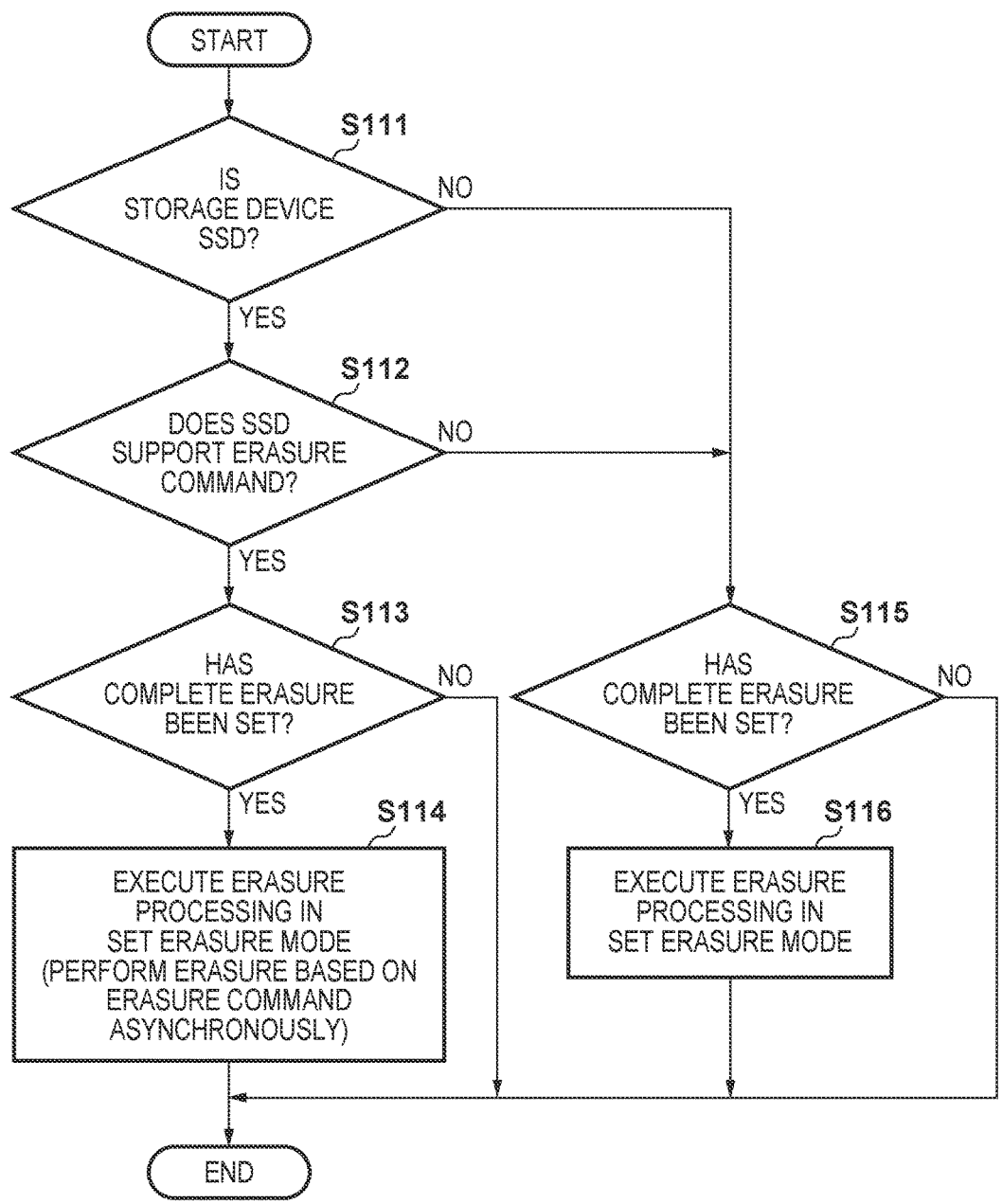

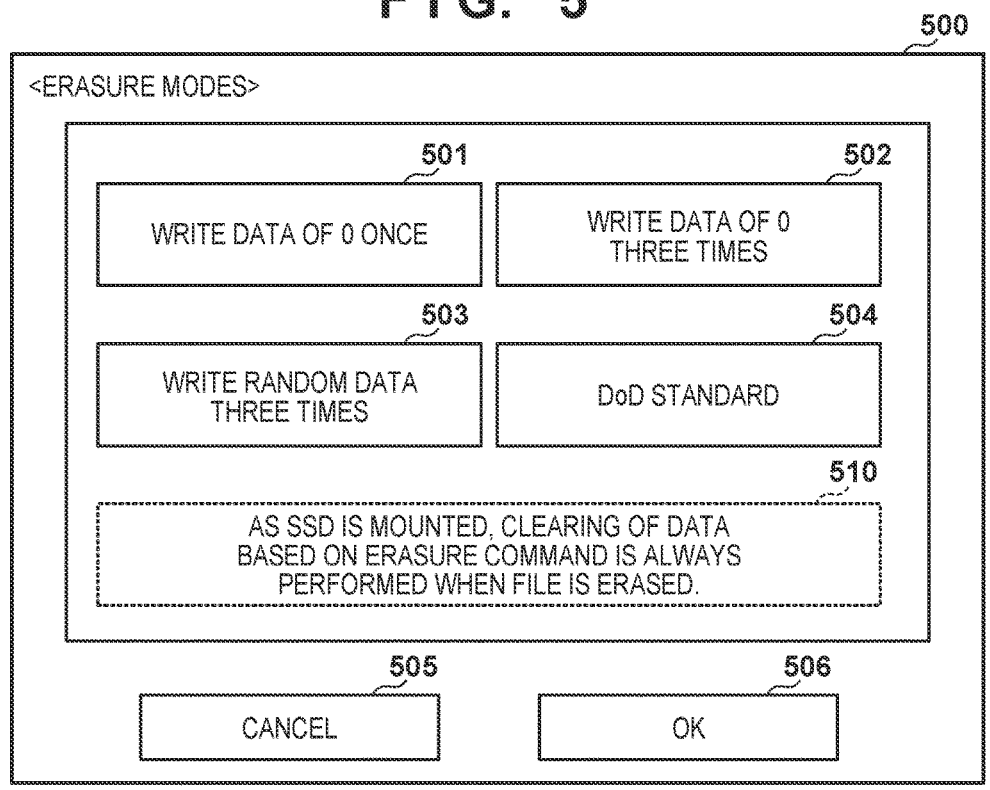

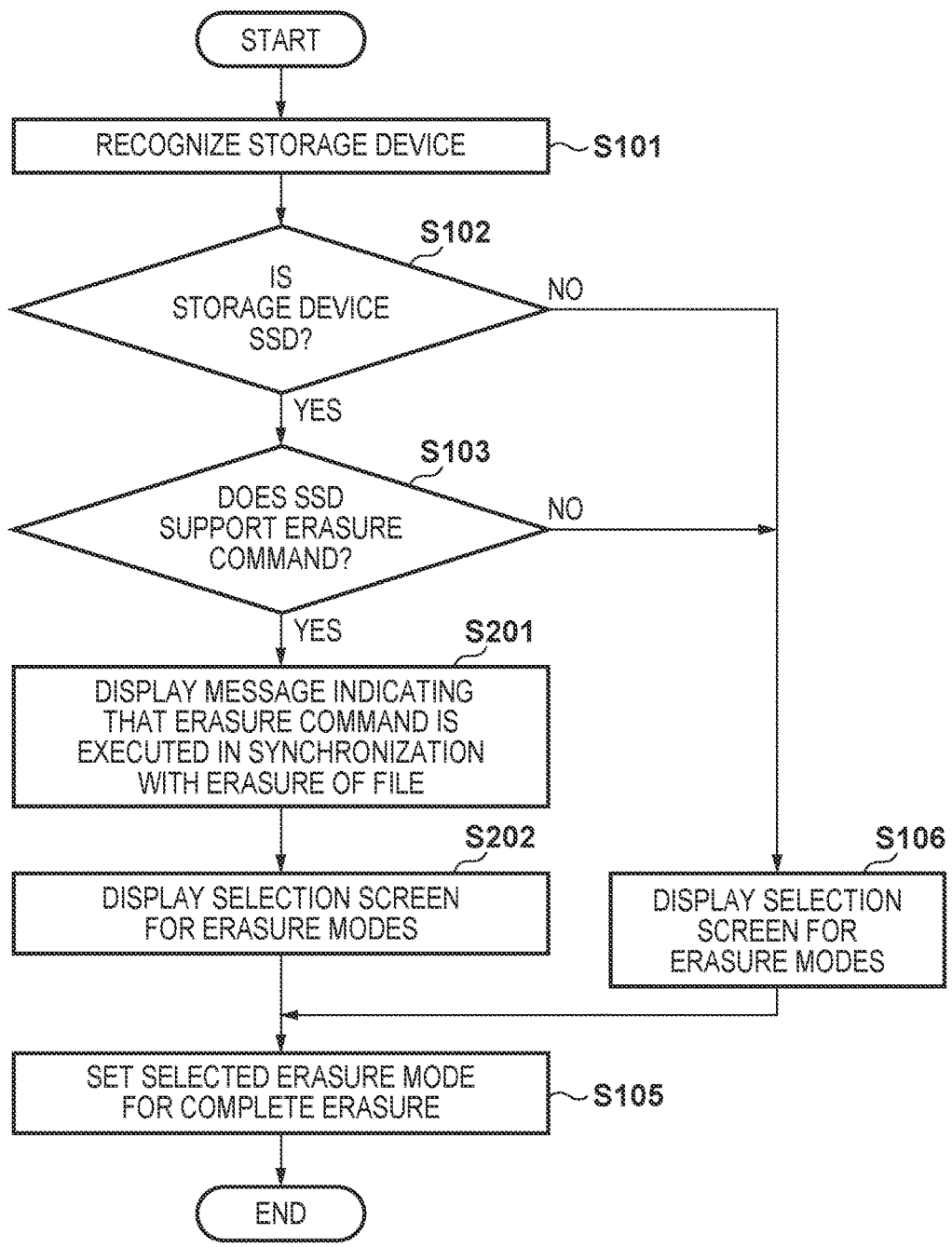

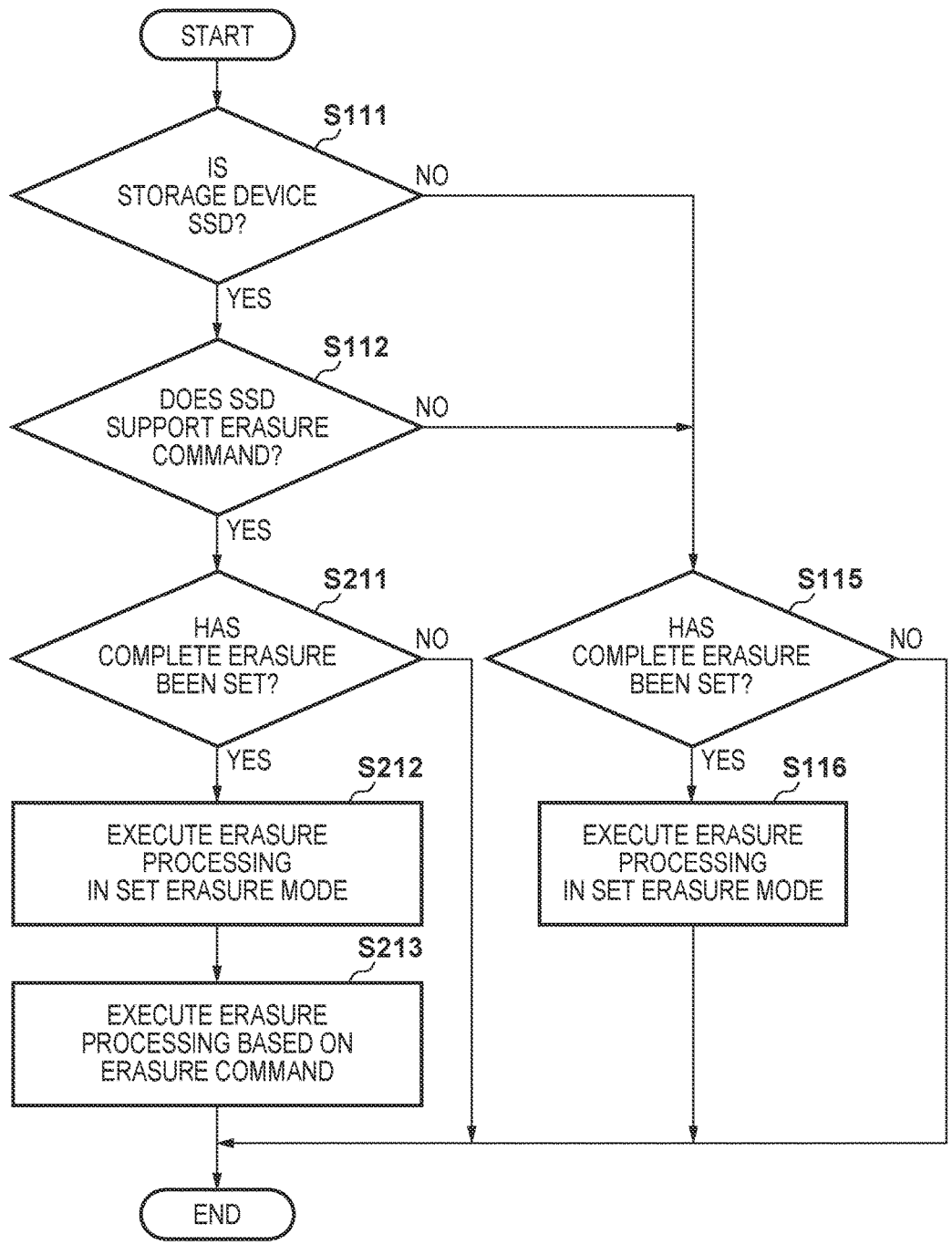

INFORMATION PROCESSING APPARATUS THAT CONTROLS DISPLAY OF AN ERASURE MODE SETTING SCREEN BASED ON A TYPE OF STORAGE DEVICE IN THE APPARATUS, AND METHOD OF CONTROLLING THE SAME

BACKGROUND OF THE INVENTION

Field of the Invention

The present invention relates to an information processing apparatus and a method of controlling the same, and in particular to erasure of data stored in a storage device that is provided in the information processing apparatus.

Description of the Related Art

In recent years, there have been studies on the use of a solid-state drive (SSD) as a secondary storage device (auxiliary storage device) installed in an image forming apparatus, such as a printer and a multi-functional peripheral (MFP), in place of a conventional hard disk drive (HDD). In general, the SSD is known to be superior to the HDD in terms of access speed and silence, but is limited in the number of times rewriting can be performed therein. To deal with such a limitation on the number of times rewriting can be performed, a wear leveling function is used to prevent concentration of writing to a specific area. The SSD is also known to be incapable of directly writing data over an area in which data has already been stored (that is to say, capable of writing data only to an area from which data has already been erased). To overwrite data in the SSD, first, an area to which data is to be written needs to be emptied by erasing data therefrom, and then data needs to be written to the emptied area.

There may be cases in which image data that was used in execution of a job needs to be erased completely from a secondary storage device of an image forming apparatus from a security standpoint. There is a known technique to perform complete erasure of data in an HDD by overwriting image data to be erased with data of, for example, random values. On the other hand, in the case of an SSD, it is difficult to overwrite data to be erased (erasure-target data) because, due to the aforementioned wear leveling function, data with which the erasure-target data is to be overwritten could possibly be written to an area different from an area in which the erasure-target data is stored. In view of this, there is a known technique to perform complete erasure of data in an SSD using a TRIM command (erasure command) and garbage collection. Japanese Patent Laid-Open No. 2015-219602 suggests an information processing apparatus that provides notification of an unneeded area using a TRIM command, erases data in the unneeded area using garbage collection, and notifies a user of invalidation of data in an SSD upon detection of completion of erasure processing.

When an SSD is installed as a secondary storage device in an information processing apparatus, such as an image forming apparatus, in place of an HDD, complete erasure of data stored in the secondary storage device cannot be realized using a method similar to a method for the HDD as described above. Furthermore, there may be cases in which an SSD installed as a secondary storage device does not support erasure based on the aforementioned erasure command. It is thus necessary to enable a user to appropriately select a method of complete erasure of data in accordance with a type of a storage device that is installed as a secondary storage device in an information processing apparatus.

SUMMARY OF THE INVENTION

The present invention has been made in view of the foregoing issues. The present invention provides a technique to enable a user to appropriately select an erasure mode for complete erasure of data stored in a secondary storage device of an information processing apparatus in accordance with a type of a storage device that is installed as the secondary storage device.

According to one aspect of the present invention, there is provided an information processing apparatus, comprising: an obtaining unit that obtains device information of a storage device provided in the information processing apparatus, the device information containing information indicating whether the storage device is of a type that supports an erasure command that provides notification of information indicating data to be erased from the storage device; and a control unit that, based on the device information, controls display of a setting screen for setting an erasure mode that erases data used in execution of a job in the information processing apparatus from the storage device, the control unit controlling whether to display an erasure mode that executes erasure processing based on the erasure command in a selectable manner in accordance with whether the storage device is of the type that supports the erasure command.

According to another aspect of the present invention, there is provided a method of controlling an information processing apparatus, the method comprising: obtaining device information of a storage device provided in the information processing apparatus, the device information containing information indicating whether the storage device is of a type that supports an erasure command that provides notification of information indicating data to be erased from the storage device; and controlling, based on the device information, display of a setting screen for setting an erasure mode that erases data used in execution of a job in the information processing apparatus from the storage device, the controlling being in control of whether to display an erasure mode that causes the storage device to execute erasure processing based on the erasure command in a selectable manner in accordance with whether the storage device is of the type that supports the erasure command.

The present invention enables a user to appropriately select an erasure mode for complete erasure of data stored in a secondary storage device of an information processing apparatus in accordance with a type of a storage device that is installed as the secondary storage device.

Further features of the present invention will become apparent from the following description of exemplary embodiments (with reference to the attached drawings).

BRIEF DESCRIPTION OF THE DRAWINGS

FIG. 2 shows examples of selection screens for erasure modes.

FIG. 3 is a flowchart showing a procedure of processing for setting an erasure mode (a first embodiment).

FIG. 4 is a flowchart showing a procedure of data erasure processing (the first embodiment).

FIG. 5 shows an example of a selection screen for erasure modes.

FIG. 6 is a flowchart showing a procedure of processing for setting an erasure mode (a second embodiment).

FIG. 7 is a flowchart showing a procedure of data erasure processing (the second embodiment).

DESCRIPTION OF THE EMBODIMENTS

Hereinafter, embodiments of the present invention will be described in detail with reference to the accompanying drawings. It should be noted that the following embodiments are not intended to limit the scope of the appended claims, and that not all the combinations of features described in the embodiments are necessarily essential to the solving means of the present invention.

First Embodiment

The first embodiment discusses, as an example of an information processing apparatus, a multi-functional peripheral (MFP) serving as an image forming apparatus (image processing apparatus) that has numerous functions, including printing, copy, image transmission, and image storage functions. Note that the present embodiment is not limited to being applied to an MFP, and can similarly be applied to other information processing apparatuses as well, including a printing apparatus (printer), a copier, a facsimile apparatus, and a PC.

<Configuration of MFP>

Figure 1:
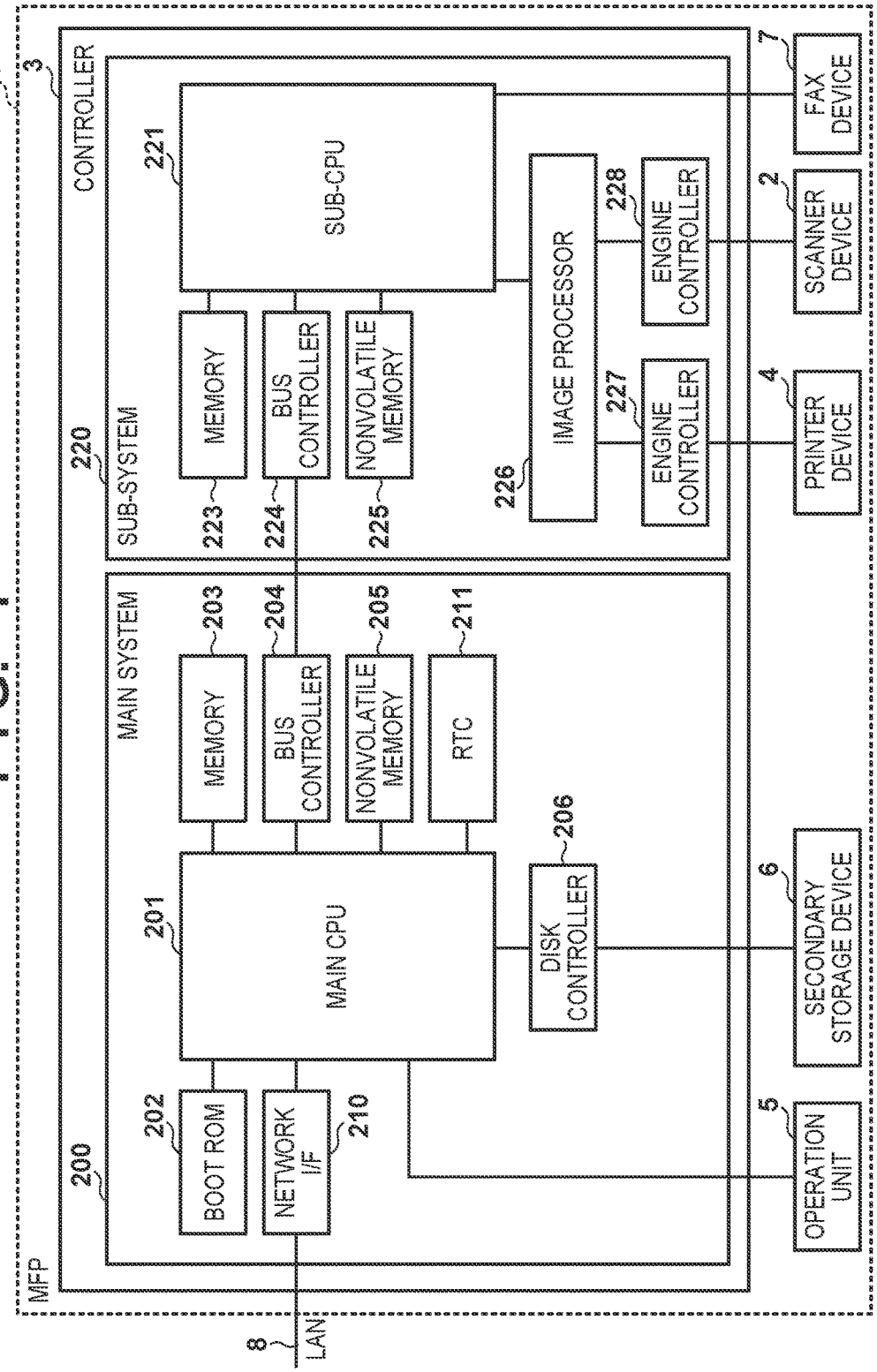
FIG. 1 is a block diagram showing an exemplary configuration of an MFP.

FIG. 1 is a block diagram showing an exemplary configuration of an MFP 1 according to the present embodiment. The MFP 1 includes a controller 3, as well as a scanner device 2, a printer device 4, an operation unit 5, a secondary storage device 6, and a FAX (facsimile) device 7 that are connected to the controller 3. The scanner device 2 optically reads an image from an original, converts the image into a digital image, and outputs the digital image as image data. The printer device 4 prints an image on a sheet (e.g., recording paper) based on image data. The operation unit 5 includes operation buttons and a display panel with a touchscreen function, and is used to accept a user operation performed on the MFP 1 and to display various types of information and operation screens. The FAX device 7 transmits image data to a designated destination via FAX transmission using telephone lines.

The secondary storage device 6 is a nonvolatile storage device, and stores image data together with, for example, control programs and application programs that are executed by a main CPU 201. The secondary storage device 6 is also referred to as an auxiliary storage device. A hard disk drive (HDD) or a solid-state drive (SSD) can be installed as the secondary storage device 6 in the MFP 1 according to the present embodiment. The SSD, which is a nonvolatile storage device constituted by a semiconductor device (e.g., a NAND-type flash memory), has a small data storage capacity but allows high-speed random access compared with the HDD.

The controller 3 is constituted by a main system (mainboard) 200 and a sub-system (sub-board) 220. The main system 200 is a CPU system for controlling an entirety of the MFP 1. The sub-system 220 is a CPU system that is connected to the main system 200 and constituted by image processing hardware. The operation unit 5, the secondary storage device 6, and the like are connected to the main system 200. The scanner device 2, the printer device 4, the FAX device 7, and the like are connected to the sub-system 220.

The main system 200 includes the main CPU 201, a boot ROM 202, a memory 203, a bus controller 204, a nonvolatile memory 205, and a disk controller 206. The main system 200 further includes a network interface (I/F) 210 and an RTC 211.

The main CPU 201 controls an entirety of the main system 200 and an entirety of the MFP 1. The boot ROM 202 stores a boot program that is executed by the main CPU 201 upon activation of the MFP 1. The memory 203 is used as a working memory for the main CPU 201. The bus controller 204 has a function of establishing a bridge to an external bus (in the present embodiment, a bus in the sub-system 220). The nonvolatile memory 205 stores, for example, setting data used by the main CPU 201. The RTC 211 has a clock function. The disk controller 206 controls the secondary storage device 6.

The sub-system 220 includes a sub-CPU 221, a memory 223, a bus controller 224, a nonvolatile memory 225, an image processor 226, and engine controllers 227, 228. The sub-CPU 221 controls an entirety of the sub-system 220 under control of the main CPU 201. The memory 223 is used as a working memory for the sub-CPU 221. The bus controller 224 has a function of establishing a bridge to an external bus (in the present embodiment, a bus in the main system 200). The nonvolatile memory 225 stores, for example, setting data used by the sub-CPU 221.

The image processor 226 applies image processing to image data output to the printer device 4, and to image data input from the scanner device 2. The engine controller 227 handles exchange of image data between the image processor 226 and the printer device 4, and controls the printer device 4 in accordance with an instruction from the sub-CPU 221. The engine controller 228 handles exchange of image data between the image processor 226 and the scanner device 2, and controls the scanner device 2 in accordance with an instruction from the sub-CPU 221. The FAX device 7 is controlled directly by the sub-CPU 221.

Although not shown in FIG. 1 for ease of explanation, the main CPU 201, the sub-CPU 221, and the like include numerous peripheral hardware components for the CPUs, such as chipsets, bus bridges, and clock generators.

<SSD Processing>

The following describes processing for erasing data in the SSD that can be installed as the secondary storage device 6 in the MFP 1. The SSD manages data inside storage areas in units of pages and in units of blocks. A page is the smallest unit of writing processing or readout processing, and normally has several kilobytes. A block is the unit of erasure processing, and is composed of a plurality of pages. In the SSD, a page to which data has already been written cannot be directly overwritten, and it is necessary to execute processing for erasing data that has already been written to a target page before writing data to the target page. This erasure processing needs to be executed in units of data erasure, that is to say, in units of blocks, rather than in units of pages. Therefore, to execute data writing processing when there is no page to which data can be written (i.e., there is no page from which data has already been erased), data erasure processing is executed in units of blocks prior to the data writing processing.

A "TRIM command" and "garbage collection" are used in connection with processing for erasing data in the SSD in units of blocks. A TRIM command is an external, ATA-standard command that notifies the SSD of an area (page)

that is no longer needed; in the present embodiment, a TRIM command is an example of an erasure command that provides notification of information indicating data to be erased from the storage device. Garbage collection is a mechanism for increasing the number of free blocks by creating blocks that include only invalid pages through re-allocation of valid pages and then executing processing for erasing these blocks. Using a TRIM command and garbage collection, the SSD increases the number of free blocks by executing erasure processing in units of blocks before a request for writing processing is issued. In this way, when a request for writing processing is issued, it is possible to avoid execution of data erasure processing prior to the writing processing, and hence to prevent a decrease in the writing speed attributed to the wait for completion of erasure of data.

Furthermore, a correspondence table (conversion table) showing a correspondence between logical addresses and physical addresses is retained inside the SSD, and the SSD executes data writing processing and data readout processing based on the conversion table. For example, the SSD can move data that is changed with high frequency to a physical page to which data has been written with low frequency, and move data that is changed with low frequency to a physical page to which data has been written with high frequency; in this way, physical areas (pages) to which data is written can be spread. At this time, the SSD updates the conversion table so as to show a physical address of a page to which data is moved in correspondence with the original logical address. In addition, when a request for new writing processing is issued, the SSD can write data preferentially to an area (page) to which data has been written with low frequency. The foregoing mechanism is called "wear leveling."

A timing of issuance of the aforementioned TRIM command (erasure command) varies depending on a file system and a mounting method. Specifically, the TRIM command may be issued at an arbitrary timing that is asynchronous with a timing of erasure of a file on the file system, or may be issued in real time at a timing that is synchronous with a timing of erasure of a file on the file system. The present embodiment pertains to an example in which the TRIM command is issued (batch processing is executed with respect to the TRIM command) asynchronously with erasure of data on the file system. Note that a second embodiment pertains to an example in which the TRIM command is issued synchronously with erasure of data on the file system.

<Example of Complete Erasure from SSD>

Figure 8A:
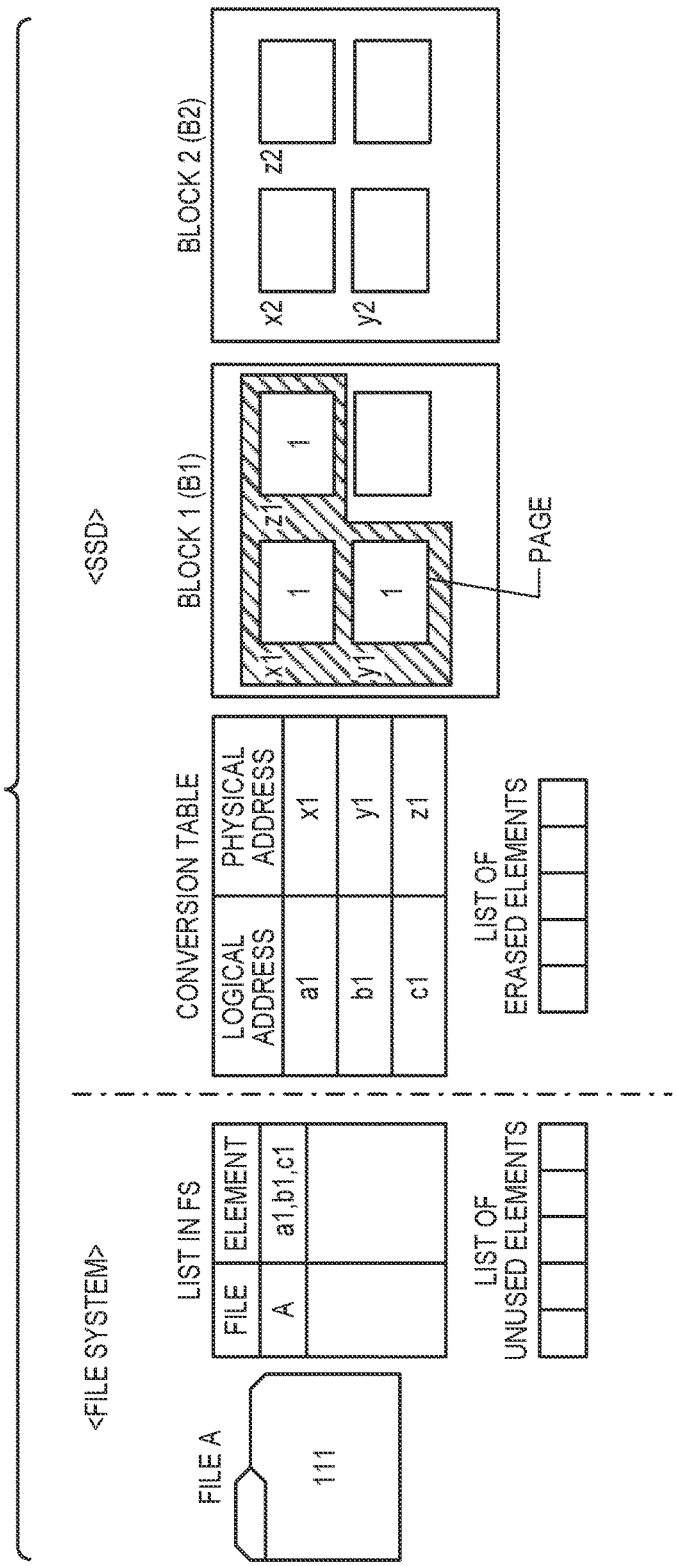
FIGS. 8A to 8C are schematic diagrams showing an example of complete erasure of data stored in an SSD.
Figure 8B:
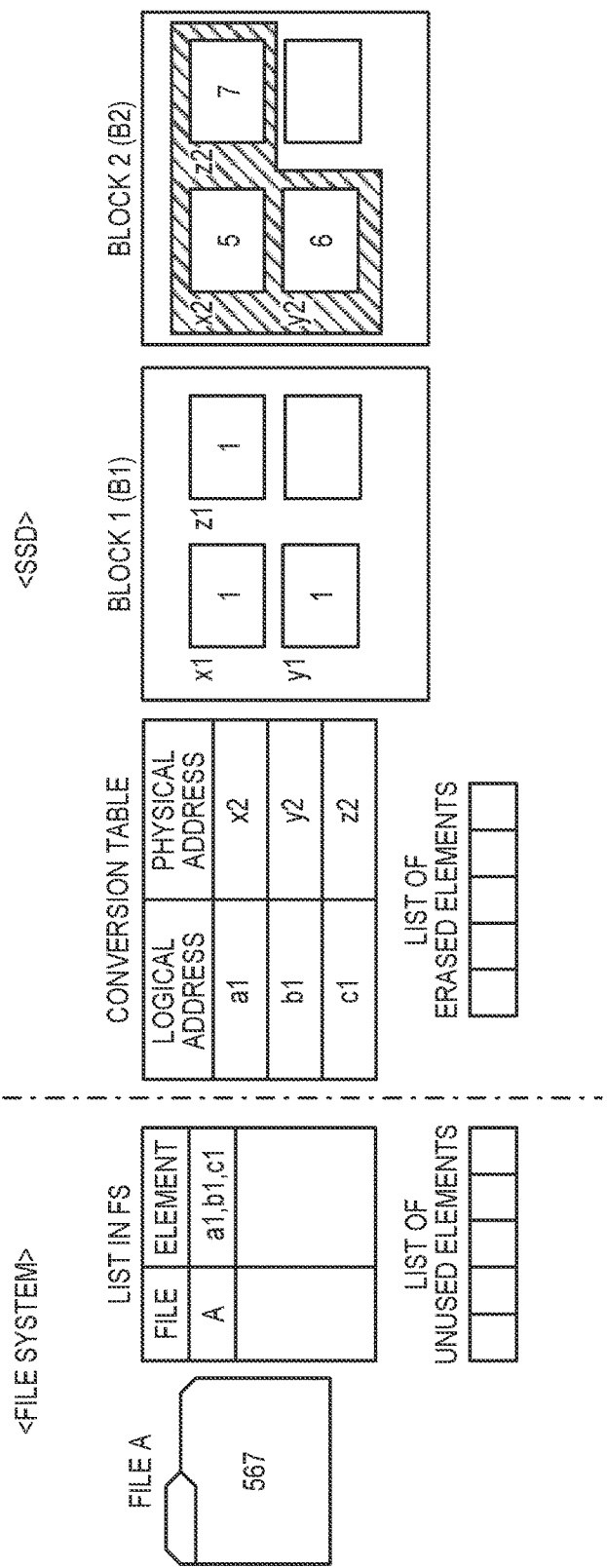
Figure 8C:
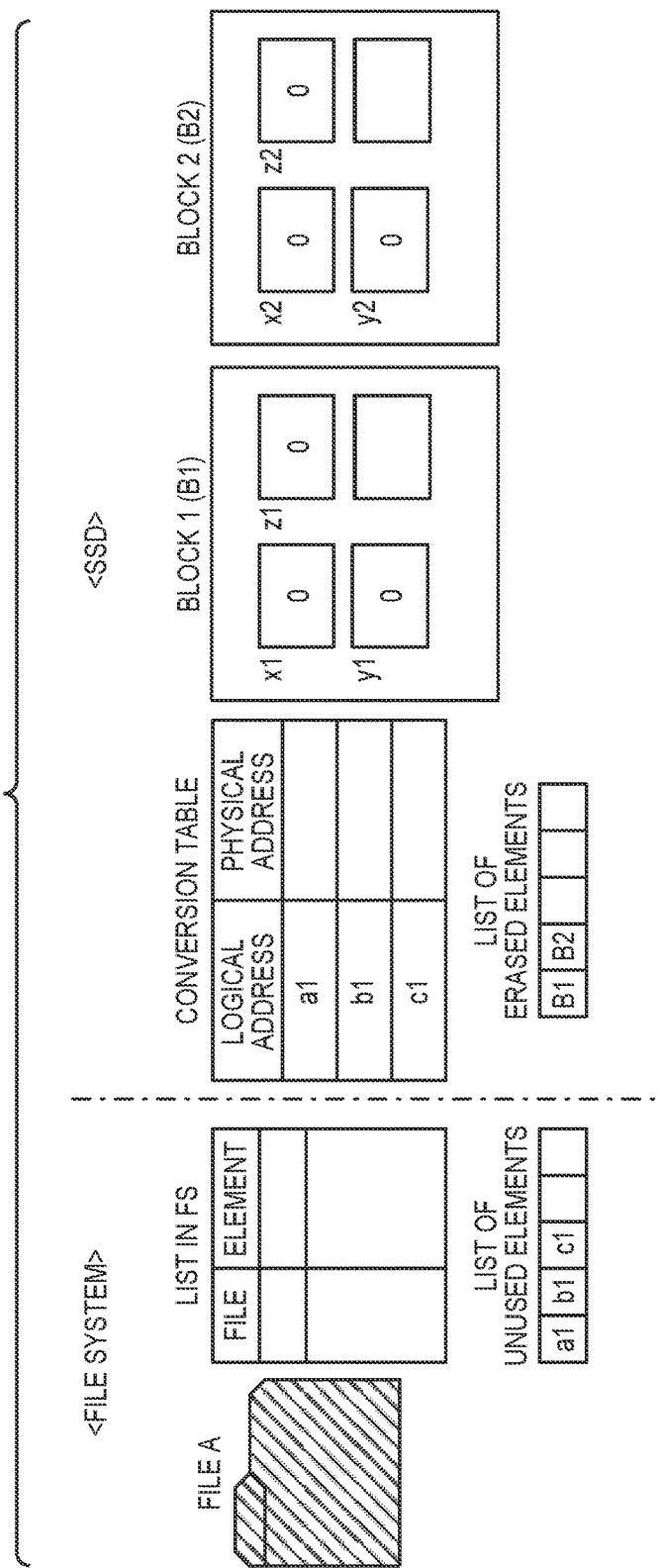

With reference to FIGS. 8A to 8C, the following describes an example of complete erasure of data stored in the SSD in a case in which the SSD is installed as the secondary storage device 6 in the MFP 1. FIGS. 8A to 8C schematically show complete erasure of file A, which corresponds to image data that was used in a job, in the MFP 1 having the SSD installed therein. Note that FIGS. 8A to 8C show an example of erasure processing that is executed in later-described step S114 (FIG. 4) or steps S212, S213 (FIG. 7) when an erasure mode has been set by pressing a button 311 on a later-described selection screen 310 (FIG. 2).

In the example shown in FIGS. 8A to 8C, the file system (FS) of an operating system (OS) operating on the MFP 1 issues a TRIM command (erasure command) to the SSD. As a result, the SSD executes processing for erasing file A based on this command. In the present example, prior to this erasure processing based on the TRIM command, erasure processing for overwriting data to be erased with random data is executed. Similar erasure processing based on overwriting is executed also when data to be erased is overwritten with the data value of 0 instead of random data composed of random values.

As shown in FIG. 8A, file A stored in the SSD is composed of data "111." Logical addresses of file A are "a1, b1, c1." The FS manages a list of logical addresses of various files. The SSD manages the above logical addresses in correspondence with physical addresses "x1, y1, z1" in the conversion table, which shows a correspondence between logical addresses and physical addresses. Each of "x1, y1, z1" indicates a page. Note that logical addresses indicate logical locations on the FS, whereas physical addresses indicate physical locations on storage areas of the SSD. In each of the pages "x1, y1, z1," "1" is stored as data.

FIG. 8B shows a state in which file A shown in FIG. 8A has been overwritten with data "567." This overwriting does not make any change to the list in the FS. On the other hand, in the conversion table of the SSD, the physical addresses corresponding to the logical addresses of file A have been updated to other addresses "x2, y2, z2." This means that, due to the aforementioned wear leveling function, data "567" that was used in overwriting has been stored to pages that are different from the pages "x1, y1, z1" indicated by the original physical addresses as shown in FIG. 8B. As in this case, even if data (file A) is overwritten on the FS, the SSD does not necessarily overwrite data in the actual physical pages in general; data used in overwriting could possibly be stored to other physical pages, and the conversion table could possibly be updated accordingly. Note that "x1, y1, z1" represent pages in block 1 (B1), whereas "x2, y2, z2" represent pages in block 2 (B2) that is different from block 1.

FIG. 8C shows processing for a case in which file A shown in FIG. 8B has been erased on the FS, and the FS has issued a TRIM command for requesting erasure of file A to the SSD. In this case, first, file A (and corresponding logical addresses) is erased from the list in the FS as shown in FIG. 8C. Thereafter, the FS issues a TRIM command in which the logical addresses "a1, b1, c1," which are no longer used are designated, to the SSD, thereby notifying the SSD of the pages that are no longer needed. Accordingly, the SSD recognizes that the pages indicated by the physical addresses "x2, y2, z2," which correspond to the logical addresses "a1, b1, c1," are no longer needed (i.e., data in these pages have been rendered erasable). Note that as a result of overwriting shown in FIG. 8B, data in the pages indicated by "x1, y1, z1" have also been rendered erasable. Thereafter, the SSD executes erasure processing with respect to blocks in which data is erasable at an arbitrary (predetermined) timing. The predetermined timing is, for example, "before reading the same blocks next." As a result, data in the pertinent pages inside block 1 and block 2 is cleared, that is to say, changed to 0, as shown in FIG. 8C. In the foregoing manner, the original data "111" of file A is completely erased from physical pages of the SSD.

<Setting Screens for Erasure Modes>

FIG. 2 shows examples of setting screens (selection screens) that are used in setting an erasure mode for erasing (i.e., performing complete erasure of) data, such as image data that was used in execution of a print job, a copy job, or other jobs, from the secondary storage device 6. The main CPU 201 (hereinafter, "CPU 201") displays selection screens 300, 310 shown in FIG. 2 on the operation unit 5 in accordance with an instruction that has been issued by a user using the operation unit 5.

In the present embodiment, the CPU 201 discriminates whether the secondary storage device 6 is of a type that supports an erasure (TRIM) command (an SSD), and controls display of a setting screen for erasure modes in accordance with the discrimination result. Specifically, in a case where an HDD is installed as the secondary storage device 6 in the MFP 1, the CPU 201 displays the selection screen 300 on the operation unit 5. On the other hand, in a case where an SSD (especially, an SSD that supports a TRIM command) is installed as the secondary storage device 6 in the MFP 1, the CPU 201 displays the selection screen 310 on the operation unit 5. Note that the HDD is an example of a storage device of a type that does not support an erasure command, whereas the SSD is an example of a storage device of a type that supports an erasure command.

(Case in which Secondary Storage Device 6 is an HDD)

The selection screen 300 is used in selecting and setting an erasure mode for complete erasure of data from the HDD installed as the secondary storage device 6 in the MFP 1. On the selection screen 300, a button 301 corresponds to an erasure mode for overwriting data to be erased with data of 0 once. A button 302 corresponds to an erasure mode for overwriting data to be erased with data of 0 three times. A button 303 corresponds to an erasure mode for overwriting data to be erased with data of random values three times. A button 304 corresponds to an erasure mode for overwriting data to be erased with data of a DoD format, which is a standard set by the United States Department of Defense. A cancel button 305 is for cancelling the erasure mode settings configured on the selection screen 300. An OK button 306 is for reflecting the erasure mode settings configured on the selection screen 300 in the settings of the MFP 1.

As described above, on the selection screen 300, (one or more) erasure modes for executing predetermined erasure processing (erasure processing based on overwriting using predetermined data) different from erasure processing based on an erasure command (TRIM command) are displayed in a selectable manner. The CPU 201 accepts a selection of an erasure mode by accepting, from the user, a selection of one of the buttons 301 to 304 on the selection screen 300. Furthermore, when the user presses the OK button 306, the CPU 201 sets the selected erasure mode as an erasure mode for complete erasure of data from the secondary storage device 6.

(Case in which Secondary Storage Device 6 is an SSD)

The selection screen 310 is used in selecting and setting an erasure mode for complete erasure of data from the SSD installed as the secondary storage device 6 in the MFP 1. On the selection screen 310, buttons 311 to 314 correspond to erasure modes for executing erasure processing based on an erasure command (TRIM command) along with execution of erasure processing based on overwriting corresponding to the buttons 301 to 304, respectively. A button 315 corresponds to an erasure mode for executing erasure processing based on an erasure command (TRIM command) without executing erasure processing based on overwriting.

As described above, on the selection screen 310, (one or more) erasure modes for executing erasure processing based on an erasure command (TRIM command) are displayed in a selectable manner. The CPU 201 accepts a selection of an erasure mode by accepting, from the user, a selection of one of the buttons 311 to 315 on the selection screen 310. Furthermore, when the user presses the OK button 306, the CPU 201 sets the selected erasure mode as an erasure mode for complete erasure of data from the secondary storage device 6.

<Processing for Setting Erasure Mode>

The MFP 1 according to this present embodiment controls display of a setting screen for erasure modes so as to enable the user to appropriately select an erasure mode for complete erasure of data stored in the secondary storage device 6 in accordance with a type of a storage device installed as the secondary storage device 6. Specifically, the CPU 201 obtains device information of the secondary storage device 6 installed in the MFP 1. Based on the obtained device information, the CPU 201 discriminates whether the secondary storage device 6 is of a type that supports an erasure command that provides notification of information indicating data to be erased from the storage device. Furthermore, in accordance with the discrimination result, the CPU 201 controls display of a setting screen for erasure modes by controlling whether to display erasure modes for executing erasure processing based on an erasure command (TRIM command) in a selectable manner as shown in FIG. 2.

With reference to a flowchart of FIG. 3, the following describes a specific procedure of processing for setting an erasure mode for erasing data stored in the secondary storage device 6. Note that the processes of steps shown in FIG. 3 may be realized by hardware, such as an FPGA and an ASIC, or may be realized by software. When the processes are realized by software, the processes may be realized by processing in which the CPU 201 reads out a control program stored in the secondary storage device 6 and the like and executes the control program. In the setting processing shown in FIG. 3, the CPU 201 discriminates a type of the secondary storage device 6, displays an operation screen based on the discrimination result on the operation unit 5, and sets an erasure mode by accepting a selection of the erasure mode from the user via the displayed operation screen.

First, in step S101, the CPU 201 recognizes the secondary storage device 6 installed in the MFP 1, and obtains device information of the recognized secondary storage device 6. Specifically, the device information of the secondary storage device 6 is obtained from a response to an ATA-standard command that has been issued by the disk controller 206 to the secondary storage device 6.

The CPU 201 can discriminate the type of the secondary storage device 6 based on rotation speed information of the secondary storage device 6 contained in the obtained device information. For example, when the rotation speed information indicates a predetermined rotation speed (e.g., 7200 rpm, 5400 rpm, etc.), the secondary storage device 6 is discriminated as an HDD. On the other hand, when the rotation speed information indicates a non-rotational medium (i.e., indicates that the disk does not rotate), the secondary storage device 6 is discriminated as an SSD. When the secondary storage device 6 is discriminated as the SSD, the CPU 201 can further discriminate whether the secondary storage device 6 supports a TRIM function (TRIM command) based on the obtained device information.

In accordance with the foregoing discrimination result, the CPU 201 determines whether the storage device installed as the secondary storage device 6 in the MFP 1 is the SSD in step S102. The CPU 201 proceeds to step S103 if the storage device is the SSD, and proceeds to step S106 if the storage device is not the SSD. In step S103, the CPU 201 determines whether the SSD installed as the secondary storage device 6 supports a TRIM command. The CPU 201 proceeds to step S104 if the SSD supports a TRIM command, and proceeds to step S106 if the SSD does not support a TRIM command. In this way, the CPU 201 proceeds to step S104 if the secondary storage device 6 is of a type that supports a TRIM command (i.e., the SSD that supports a TRIM command), and proceeds to step S106 otherwise.

In step S104, the CPU 201 displays an operation screen for selecting an erasure mode corresponding to the SSD (the selection screen 310 shown in FIG. 2) on the operation unit 5, and accepts a selection of an erasure mode by the user. As shown in FIG. 2, on the selection screen 310, erasure modes for executing erasure processing based on a TRIM command (erasure command) are displayed in a selectable manner. If the user selects an erasure mode and presses the OK button 306 on the selection screen 310, the CPU 201 proceeds to step S105.

On the other hand, if the CPU 201 has proceeded to step S106 from step S102 or S103, it displays an operation screen for selecting an erasure mode corresponding to the HDD (the selection screen 300 shown in FIG. 2) on the operation unit 5, and accepts a selection of an erasure mode by the user. In this way, in a case where the secondary storage device 6 is the HDD, or in a case where the secondary storage device 6 is the SSD that does not support a TRIM command (erasure command), the selection screen 300 is displayed. As shown in FIG. 2, on the selection screen 300, erasure modes for executing erasure processing based on overwriting using predetermined data are displayed in a selectable manner. If the user selects an erasure mode and presses the OK button 306 on the selection screen 300, the CPU 201 proceeds to step S105.

In step S105, the CPU 201 sets the erasure mode that has been selected on the selection screen 300 or 310 as an erasure mode for complete erasure of data from the secondary storage device 6, and then ends the present processing.

<Erasure Processing for Complete Erasure of Data>

With reference to a flowchart of FIG. 4, the following describes a specific procedure for executing data erasure processing in an erasure mode that has been set by the setting processing shown in FIG. 3. The file system (FS) of the OS operating on the MFP 1 manages files stored in the secondary storage device 6. The processing shown in FIG. 4 is executed when a file (data) is erased on the file system. Note that the processes of steps shown in FIG. 4 may be realized by hardware, such as an FPGA and an ASIC, or may be realized by software. When the processes are realized by software, the processes may be realized by processing in which the CPU 201 reads out a control program stored in the secondary storage device 6 and the like and executes the control program.

In an example described below, it will be assumed that the foregoing erasure mode is set to erase a file (data) that is stored in the secondary storage device 6 and was used in execution of a job on the MFP 1 (generated at the time of execution of the job) from the secondary storage device 6 after completion of execution of the job. A file is erased on the file system when, for example, an operation for erasing the file is performed on the operation unit 5 after completion of execution of a job. Note that a file may be erased on the file system in accordance with completion of execution of a job that uses the file. Alternatively, a file may be erased in accordance with completion of processing that uses the file during execution of a job that uses the file.

Once a file has been erased on the file system, the CPU 201 obtains device information of the secondary storage device 6 similarly to step S101, and discriminates a type of the secondary storage device 6 based on the obtained device information. Furthermore, when the secondary storage device 6 is discriminated as an SSD, the CPU 201 further discriminates whether the secondary storage device 6 supports a TRIM function (TRIM command).

In accordance with the foregoing discrimination result, the CPU 201 determines whether the storage device installed as the secondary storage device 6 in the MFP 1 is the SSD in step S111. The CPU 201 proceeds to step S112 if the storage device is the SSD, and proceeds to step S115 if the storage device is not the SSD. In step S112, the CPU 201 determines whether the SSD installed as the secondary storage device 6 supports a TRIM command. The CPU 201 proceeds to step S113 if the SSD supports a TRIM command, and proceeds to step S115 if the SSD does not support a TRIM command.

In step S113, the CPU 201 determines whether a setting for performing complete erasure of data that was used in a job has been configured. Specifically, the CPU 201 determines whether an erasure mode for completely erasing the data that was used in the job from the secondary storage device 6 has been set using the selection screen 310 corresponding to the SSD. The CPU 201 ends the present processing if it determines that such a setting has not been configured, and proceeds to step S114 if it determines that such a setting has been configured.

In step S114, the CPU 201 causes the secondary storage device 6 to execute, in the set erasure mode, processing for erasing the data to be erased, that is to say, the data whose file has been erased on the file system. At this time, the CPU 201 issues a TRIM command (erasure command) that includes a designation of logical addresses (pages) in which the data to be erased is stored, to the secondary storage device 6 at a timing that is asynchronous with erasure of the file on the file system. The SSD executes the processing for erasing the data to be erased based on the issued TRIM command. Thereafter, the CPU 201 ends the present processing.

On the other hand, in step S115, the CPU 201 determines whether a setting for performing complete erasure of the data that was used in the job has been configured. Specifically, the CPU 201 determines whether an erasure mode for completely erasing the data that was used in the job from the secondary storage device 6 has been set using the selection screen 300 corresponding to the HDD. The CPU 201 ends the present processing if it determines that such a setting has not been configured, and proceeds to step S116 if it determines that such a setting has been configured.

In step S116, the CPU 201 causes the secondary storage device 6 to execute, in the set erasure mode, processing for erasing the data to be erased, that is to say, the data whose file has been erased on the file system. In other words, the CPU 201 executes erasure processing based on overwriting using predetermined data. Thereafter, the CPU 201 ends the present processing.

The foregoing procedure enables complete erasure of data to be erased that was used in a job in a case where an SSD is installed as the secondary storage device 6 and a TRIM command (erasure command) is issued to the SSD asynchronously with erasure of a file on the file system. The foregoing procedure also enables complete erasure of data to be erased that was used in a job also in a case where an HDD is installed as the secondary storage device 6.

As described above, in the MFP 1 of the present embodiment in which storage devices of multiple types (e.g., an SSD and an HDD) can be installed as the secondary storage device 6, a type of the secondary storage device 6 is discriminated and display of a setting screen for erasure modes is controlled. Specifically, display of a setting screen for erasure modes is controlled by controlling, in accordance with the result of discrimination of the type of the secondary storage device 6, whether to display erasure modes for executing erasure processing based on an erasure command (TRIM command) in a selectable manner. This enables the user to appropriately select an erasure mode for complete erasure of data stored in the secondary storage device 6 in accordance with a type of a storage device installed as the secondary storage device 6. Therefore, complete erasure can be performed in the appropriately selected erasure mode, and the security level of the MFP 1 can be improved.

Second Embodiment

The following describes a second embodiment pertaining to an example in which, in a case where an SSD is installed as the secondary storage device 6 in the MFP 1, the CPU 201 issues a TRIM command (erasure command) to the SSD in synchronization with erasure of data on the file system. The following description focuses on the differences from the first embodiment for ease of explanation.

FIG. 5 shows an example of a setting screen (selection screen) according to the present embodiment, which is used in setting an erasure mode for completely erasing data that was used in a job from the secondary storage device 6. In the present embodiment, in a case where an HDD is installed as the secondary storage device 6 in the MFP 1, the CPU 201 displays the selection screen 300 on the operation unit 5 similarly to the first embodiment. On the other hand, in a case where an SSD is installed as the secondary storage device 6 in the MFP 1, the CPU 201 displays a selection screen 500 shown in FIG. 5 on the operation unit 5.

On the selection screen 500, buttons 501 to 504 correspond to erasure processing based on overwriting corresponding to the buttons 301 to 304 on the selection screen 300, respectively. The selection screen 500 also displays a message 510 indicating that erasure processing based on an erasure command is executed irrespective of the erasure mode settings that have been configured. Thus, in the present embodiment, in a case where an SSD is installed as the secondary storage device 6, the CPU 201 always executes erasure processing based on an erasure command irrespective of the erasure mode settings that have been configured. Note that a cancel button 505 and an OK button 506 function similarly to the cancel button 305 and the OK button 306 according to the first embodiment, respectively.

Referring to FIG. 5, the buttons 501 to 504 may be invalidated in such a manner that they cannot be selected by the user, in which case the user can set an erasure mode for complete erasure simply by pressing the OK button 506. In this case, in order to perform complete erasure of data stored in the SSD, the CPU 201 executes only erasure processing based on an erasure command. In this way, in a case where the SSD is installed as the secondary storage device 6 in the MFP 1, complete erasure can be performed without executing erasure processing based on overwriting. This can avoid shortening of the lifetime of the SSD, which is limited in the number of times rewriting can be performed therein, due to overwriting of data.

<Processing for Setting Erasure Mode>

With reference to a flowchart of FIG. 6, the following describes a specific procedure of processing for setting an erasure mode for erasing data stored in the secondary storage device 6 in the present embodiment. The processes of steps shown in FIG. 6 may be realized by hardware, such as an FPGA and an ASIC, or may be realized by software similarly to those shown in FIG. 3. The following description focuses on the differences from FIG. 3.

In the present embodiment, if the CPU 201 determines that the storage device installed as the secondary storage device 6 in the MFP 1 is an SSD that supports a TRIM command ("YES" of step S103), it proceeds to step S201. In step S201, the CPU 201 displays the selection screen 500 on the operation unit 5 to display the message 510 on this selection screen. In this way, the CPU 201 displays (i.e., notifies the user of) a message indicating that erasure processing based on a TRIM command (erasure command) is executed in synchronization with erasure of a file on the file system. This enables the user to confirm that, upon erasure of data, such as image data that was used in a job, data stored in the SSD is completely erased by being cleared, that is to say, replaced with 0 by erasure processing based on an erasure command.

Thereafter, in step S202, the CPU 201 displays the buttons 501 to 504 as the selection screen 500 for a case in which erasure processing based on overwriting is necessary as shown in FIG. 5. In this way, a selection of any of the buttons 501 to 504 on the selection screen 500 by the user is accepted when necessary. Thereafter, the CPU 201 proceeds to step S105, sets an erasure mode selected on the selection screen 300 or 500 as an erasure mode for complete erasure of data from the secondary storage device 6, and then ends the present processing.

<Erasure Processing for Complete Erasure of Data>

With reference to a flowchart of FIG. 7, the following describes a specific procedure for executing data erasure processing in an erasure mode that has been set by the setting processing shown in FIG. 6 in the present embodiment. The processing shown in FIG. 7 is executed when a file (data) is erased on the file system similarly to that shown in FIG. 4. The processes of steps shown in FIG. 7 may be realized by hardware, such as an FPGA and an ASIC, or may be realized by software similarly to those shown in FIG. 4. The following description focuses on the differences from FIG. 4.

In the present embodiment, the CPU 201 executes the processes of steps S211 to S213 in place of steps S113 and S114 shown in FIG. 4. If the CPU 201 determines that the storage device installed as the secondary storage device 6 in the MFP 1 is an SSD that supports a TRIM command ("YES" of step S112), it proceeds to step S211. In step S211, the CPU 201 determines whether a setting for performing complete erasure of data that was used in a job has been configured. The CPU 201 ends the present processing if it determines that such a setting has not been configured, and proceeds to step S212 if it determines that such a setting has been configured.

In step S212, the CPU 201 causes the secondary storage device 6 to execute, in the set erasure mode, processing for erasing the data to be erased, that is to say, the data whose file has been erased on the file system. Furthermore, in step S213, the CPU 201 issues a TRIM command (erasure command) that includes a designation of logical addresses (pages) in which the data to be erased is stored to the secondary storage device 6 at a timing that is synchronous with erasure of the file on the file system. Thereafter, the CPU 201 ends the present processing. In this way, the SSD executes processing for erasing the data to be erased based on the issued TRIM command.

As described above, the present embodiment enables the user to appropriately select an erasure mode for complete erasure of data even when a TRIM command is issued synchronously with erasure of data on the file system. Furthermore, in a case where an SSD is installed as the secondary storage device 6, the user can be notified of the unnecessity of execution of erasure processing based on overwriting by displaying, on the selection screen 500, a message indicating that erasure processing based on an erasure command is executed irrespective of an erasure mode that has been set. This can avoid shortening of the lifetime of the SSD, which is limited in the number of times rewriting can be performed therein, due to execution of erasure processing based on overwriting of data.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-177141, filed Sep. 9, 2016, which is hereby incorporated by reference herein in its entirety.

What is claimed is:
1. An information processing apparatus, comprising:
a storage device;
a display;
a memory that stores instructions; and
at least one processor that, upon execution of the stored instructions:
causes a first screen to be displayed on the display in a case where the storage device is a semiconductor device that supports an erasure command for causing the semiconductor device to execute erasure processing, and causes a second screen that is different from the first screen to be displayed on the display in a case where the storage device is a magnetic device,
wherein the first screen is a screen on which is selectable a predetermined erasure mode among a plurality of erasure modes for executing erasure processing based on the erasure command, and the second screen is a screen on which is selectable a predetermined erasure mode among a plurality of erasure modes for executing predetermined erasure processing that does not use the erasure command; and
erases data stored in the storage device based on an erasure mode selected on the first screen or the second screen.

2. The information processing apparatus according to claim 1, wherein the data stored in the storage device is data used in execution of a print job.

3. The information processing apparatus according to claim 2, wherein the erasure mode is set to erase data used in execution of the print job from the storage device after completion of execution of the job.

4. The information processing apparatus according to claim 1, wherein the magnetic device is an HDD, and the semiconductor device is an SSD.

5. The information processing apparatus according to claim 1, wherein the at least one processor does not cause the first screen to be displayed in a case where the storage device is a semiconductor device that does not supports the erasure command.

6. The information processing apparatus according to claim 5, wherein the at least one processor obtains device information of the storage device, and determines whether the storage device is a semiconductor device that supports the erasure command or a semiconductor device that does not support the erasure command.

7. The information processing apparatus according to claim 1, wherein the data stored in the storage device is data used in execution of a copy job.

8. The information processing apparatus according to claim 7, wherein the erasure mode is set to erase data used in execution of the copy job from the storage device after completion of execution of the job.

9. The information processing apparatus according to claim 1, wherein the at least one processor obtains rotation speed information of the storage device, and determines whether the storage device is a magnetic device or a semiconductor device based on the obtained rotation speed information.

10. The information processing apparatus according to claim 1, wherein in the case where the storage device is a semiconductor device that supports the erasure command, the at least one processor causes the storage device to execute erasure processing based on the erasure command by issuing the erasure command to the storage device.

11. The information processing apparatus according to claim 1, wherein in the case where the storage device is a semiconductor device that supports the erasure command, the at least one processor issues the erasure command to the storage device at a timing that is asynchronous with a timing of erasure of the data on a file system of the information processing apparatus.

12. The information processing apparatus according to claim 1, wherein the plurality of erasure modes included in the first screen include an erasure mode for executing erasure processing based on the erasure command, and at least one erasure mode for predetermined erasure processing different from erasure processing based on the erasure command and executing erasure processing based on the erasure command.

13. The information processing apparatus according to claim 1, wherein the plurality of erasure modes included in the second screen include at least an erasure mode for executing erasure processing of writing predetermined data a plurality number of times.

14. The information processing apparatus according to claim 1, wherein in the case where the storage device is a semiconductor device that supports the erasure command, the at least one processor issues the erasure command to the storage device at a timing that is synchronous with a timing of erasure of the data on a file system of the information processing apparatus.

15. The information processing apparatus according to claim 14, wherein in the case where the storage device is a semiconductor device that supports the erasure command, the at least one processor displays, on the display, a message indicating that erasure processing based on the erasure command is executed at a timing that is synchronous with a timing of erasure of the data on the file system of the information processing apparatus.

16. A method of controlling an information processing apparatus, the method comprising:
   causing a first screen to be displayed on a display in a case where a storage device is a semiconductor device that supports an erasure command for causing the semiconductor device to execute erasure processing, and causes a second screen that is different from the first screen to be displayed on the display in a case where the storage device is a magnetic device, wherein the first screen is a screen on which is selectable a predetermined erasure mode among a plurality of erasure modes for executing erasure processing based on the erasure command, and the second screen is a screen on which is selectable a predetermined erasure mode among a plurality of erasure modes for executing predetermined erasure processing that does not used the erasure command; and
   erasing data stored in the storage device based on an erasure mode selected on the first screen or the second screen.

17. The method according to claim 16, wherein the data stored in the storage device is data used in execution of a job.

18. The method according to claim 16, wherein the erasure mode is set to erase data used in execution of a job from the storage device after completion of execution of the job.

19. The method according to claim 16, wherein the magnetic device is an HDD, and the semiconductor device is an SSD.

20. The method according to claim 16, wherein the first screen is not caused to be displayed in a case where the storage device is a semiconductor device that does not supports the erasure command.

21. The method according to claim 20, further comprising obtaining device information of the storage device; and determining whether the storage device is a semiconductor device that supports the erasure command or a semiconductor device that does not support the erasure command.

22. The method according to claim 16, wherein the data stored in the storage device is data used in execution of a copy job.

23. The method according to claim 22, wherein the erasure mode is set to erase data used in execution of the copy job from the storage device after completion of execution of the job.

24. The method according to claim 16, further comprising obtaining rotation speed information of the storage device; and
   determining whether the storage device is a magnetic device or a semiconductor device based on the obtained rotation speed information.

25. The method according to claim 16, further comprising in the case where the storage device is a semiconductor device that supports the erasure command, causing the storage device to execute erasure processing based on the erasure command by issuing the erasure command to the storage device.

26. The method according to claim 16, further comprising in the case where the storage device is a semiconductor device that supports the erasure command, issuing the erasure command to the storage device at a timing that is asynchronous with a timing of erasure of the data on a file system of the information processing apparatus.

27. The method according to claim 16, wherein the plurality of erasure modes included in the first screen include an erasure mode for executing erasure processing based on the erasure command, and at least one erasure mode for predetermined erasure processing different from erasure processing based on the erasure command and executing erasure processing based on the erasure command.

28. The method according to claim 16, wherein the plurality of erasure modes included in the second screen include at least an erasure mode for executing erasure processing of writing predetermined data a plurality number of times.

29. The method according to claim 16, further comprising in the case where the storage device is a semiconductor device that supports the erasure command, issuing the erasure command to the storage device at a timing that is synchronous with a timing of erasure of the data on a file system of the information processing apparatus.

30. The method according to claim 29, further comprising in the case where the storage device is a semiconductor device that supports the erasure command, displaying, on the display, a message indicating that erasure processing based on the erasure command is executed at a timing that is synchronous with a timing of erasure of the data on the file system of the information processing apparatus.

31. An information processing apparatus, comprising:
   a storage device;
   a display;
   a memory that stores instructions; and
   at least one processor that, upon execution of the stored instructions:
      causes a first screen to be displayed on the display in a case where the storage device is a semiconductor device that supports an Trim command for causing the semiconductor device to execute erasure processing, and causes a second screen that is different from the first screen to be displayed on the display in a case where the storage device is a magnetic device, wherein the first screen is a screen on which an erasure mode for executing erasure processing based on the Trim command is selectable, and the second screen is a screen on which an erasure mode for executing erasure processing that is not based on the Trim command is selectable; and
      erases data stored in the storage device based on an erasure mode selected on the first screen or the second screen.

32. The information processing apparatus according to claim 31, wherein the first screen that includes a plurality of erasure modes each of which is an erasure mode for executing erasure processing based on the Trim command.

33. The information processing apparatus according to claim 32, wherein the second screen that includes a plurality of erasure modes each of which is an erasure mode for executing erasure processing that is not based on the Trim command.

34. The information processing apparatus according to claim 33, wherein the plurality of erasure modes included in the second screen include at least an erasure mode for executing erasure processing of writing predetermined data a plurality number of times.

35. The information processing apparatus according to claim 32, wherein the plurality of erasure modes included in the first screen include an erasure mode for executing erasure processing based on the Trim command, and at least one erasure mode for predetermined erasure processing different from erasure processing based on the Trim command and executing erasure processing based on the Trim command.

36. The information processing apparatus according to claim 31, wherein the data stored in the storage device is data used in execution of a print job.

37. The information processing apparatus according to claim 36, wherein the erasure mode is set to erase data used in execution of the print job from the storage device after completion of execution of the job.

38. The information processing apparatus according to claim 31, wherein the magnetic device is an HDD, and the semiconductor device is an SSD.

39. The information processing apparatus according to claim 31, wherein the at least one processor does not cause the first screen to be displayed in a case where the storage device is a semiconductor device that does not supports the Trim command.

40. The information processing apparatus according to claim 31, wherein the data stored in the storage device is data used in execution of a copy job.

41. The information processing apparatus according to claim 40, wherein the erasure mode is set to erase data used in execution of the copy job from the storage device after completion of execution of the job.

42. The information processing apparatus according to claim 31, wherein the at least one processor obtains rotation speed information of the storage device, and determines whether the storage device is a magnetic device or a semiconductor device based on the obtained rotation speed information.

43. The information processing apparatus according to claim 31, wherein in the case where the storage device is a semiconductor device that supports the Trim command, the at least one processor causes the storage device to execute erasure processing based on the Trim command by issuing the Trim command to the storage device.

44. The information processing apparatus according to claim 31, wherein in the case where the storage device is a semiconductor device that supports the Trim command, the at least one processor issues the Trim command to the storage device at a timing that is asynchronous with a timing of erasure of the data on a file system of the information processing apparatus.

45. The information processing apparatus according to claim 31, wherein in the case where the storage device is a semiconductor device that supports the Trim command, the at least one processor issues the Trim command to the storage device at a timing that is synchronous with a timing of erasure of the data on a file system of the information processing apparatus.

46. The information processing apparatus according to claim 31, wherein in the case where the storage device is a semiconductor device that supports the Trim command, the at least one processor displays, on the display, a message indicating that erasure processing based on the Trim command is executed at a timing that is synchronous with a timing of erasure of the data on the file system of the information processing apparatus.

47. The information processing apparatus according to claim 31, wherein the at least one processor obtains device information of the storage device, and determines whether the storage device is a semiconductor device that supports the Trim command or a semiconductor device that does not support the Trim command.

* * * * *